United States Patent
Antoine et al.

(10) Patent No.: US 9,722,710 B2
(45) Date of Patent: Aug. 1, 2017

(54) PAIRING DEVICE

(71) Applicant: GEMALTO SA, Meudon (FR)

(72) Inventors: Matthieu Antoine, Meudon (FR); Evangelos Spyropoulos, Meudon (FR)

(73) Assignee: GEMALTO SA, Meudon (FR)

(*) Notice: Subject to any disclaimer, the term of this patent is extended or adjusted under 35 U.S.C. 154(b) by 0 days.

(21) Appl. No.: 14/896,641

(22) PCT Filed: Jun. 6, 2014

(86) PCT No.: PCT/EP2014/061908
§ 371 (c)(1),
(2) Date: Dec. 7, 2015

(87) PCT Pub. No.: WO2014/195499
PCT Pub. Date: Dec. 11, 2014

(65) Prior Publication Data
US 2016/0127050 A1 May 5, 2016

(30) Foreign Application Priority Data
Jun. 7, 2013 (EP) .................................... 13305772

(51) Int. Cl.
H04B 10/85 (2013.01)
H04W 76/02 (2009.01)
(Continued)

(52) U.S. Cl.
CPC ............ *H04B 10/85* (2013.01); *H04B 1/3827* (2013.01); *H04B 5/0012* (2013.01);
(Continued)

(58) Field of Classification Search
CPC ............. H04B 5/00–5/02; H04B 10/85; H04B 10/1149–10/116; H04B 1/3827;
(Continued)

(56) References Cited

U.S. PATENT DOCUMENTS

| 7,542,720 | B2* | 6/2009 | Yoda | H04B 13/005 455/41.1 |
| 2002/0128030 | A1* | 9/2002 | Eiden | H04B 13/005 455/519 |

(Continued)

FOREIGN PATENT DOCUMENTS

WO WO2013053923 A1 10/2012

OTHER PUBLICATIONS

"What you touch is yours; SMARTBAN(13)001011_eGO_project", ETSI Draft; 650, Route Des Lucioles; F-06921 Sophia-Antipolis; France, vol. smartban, May 28, 2013, pp. 1-19, XP014156138, the whole document.
(Continued)

Primary Examiner — Gennadiy Tsvey
(74) Attorney, Agent, or Firm — The Jansson Firm; Pehr B. Jansson

(57) ABSTRACT

A pairing device for establishing a secure wireless communication path between a first device having a first body-coupling communication interface and a second device having a screen. The pairing device includes a screen communication interface having a light sensor, which, in conjunction with the screen of the second device, allows definition of a light-based communication path for the transmission of a first pairing information from the second device to the pairing device, a calculator for generating a second pairing information once the first pairing information has been received by the pairing device, a second body-coupling communication interface, which in conjunction with the first body-coupling communication interface allows the definition of a body-coupling communication path for the transmission of the second pairing information from the pairing device to the first device, the second pairing information allowing the establishment of a secure wireless communication path between the first device and the second device.

14 Claims, 1 Drawing Sheet

(51) Int. Cl.
- *H04B 13/00* (2006.01)
- *H04L 29/06* (2006.01)
- *H04W 12/06* (2009.01)
- *H04B 10/114* (2013.01)
- *H04B 10/116* (2013.01)
- *H04W 4/00* (2009.01)
- *H04W 12/04* (2009.01)
- *H04B 1/3827* (2015.01)
- *H04B 5/00* (2006.01)

(52) U.S. Cl.
CPC ....... *H04B 10/116* (2013.01); *H04B 10/1149* (2013.01); *H04B 13/005* (2013.01); *H04L 63/0492* (2013.01); *H04L 63/0853* (2013.01); *H04W 4/008* (2013.01); *H04W 12/04* (2013.01); *H04W 12/06* (2013.01); *H04W 76/02* (2013.01)

(58) Field of Classification Search
CPC ................ H04B 13/005; H04W 4/008; H04W 12/04–12/06; H04W 76/02; H04L 63/0492–63/0853
See application file for complete search history.

(56) References Cited

U.S. PATENT DOCUMENTS

| | | | | |
|---|---|---|---|---|
| 2003/0149874 A1* | 8/2003 | Balfanz | ............... | H04L 63/0492 713/168 |
| 2004/0248513 A1* | 12/2004 | Glass | .................... | H04W 40/24 455/41.1 |
| 2008/0294722 A1* | 11/2008 | Park | .................... | H04B 13/005 709/204 |
| 2009/0070472 A1* | 3/2009 | Baldus | ................ | A61B 5/0028 709/227 |
| 2009/0233548 A1 | 9/2009 | Andersson | | |
| 2009/0247080 A1* | 10/2009 | Falck | ................... | H04B 13/005 455/41.2 |
| 2009/0275283 A1* | 11/2009 | Zhuyan | ............... | A61B 5/0028 455/41.2 |
| 2010/0079414 A1* | 4/2010 | Ferlitsch | ............. | G06F 3/03545 345/179 |
| 2010/0277435 A1* | 11/2010 | Han | ...................... | G06F 3/0416 345/174 |
| 2011/0080398 A1* | 4/2011 | Kawakami | ............ | G09G 5/006 345/418 |
| 2011/0145894 A1* | 6/2011 | Garcia Morchon | ...................... | G06F 19/3412 726/4 |
| 2011/0148652 A1* | 6/2011 | Kim | ..................... | H04B 10/116 340/691.1 |
| 2014/0313154 A1* | 10/2014 | Bengtsson | ........... | H04B 13/005 345/174 |
| 2014/0325614 A1* | 10/2014 | Rhelimi | ................ | H04W 12/06 726/4 |
| 2015/0145763 A1* | 5/2015 | Kamide | ................. | G06F 3/011 345/156 |

OTHER PUBLICATIONS

"What you touch in yours; SMARTBAN(13)001-11_eGO_project", ETSI Draft; 650, Route Des Lucioles; F-06921 Sophia-Antipolis; France, vol. smartban, May 28, 2013, pp. 1-19, XP014156138.

PCT/EP2014/061908, International Search Report, Jun. 20, 2014, European Patent Office, P.B. 5818 Patentlaan 2 NL-2280 HV Rijswijk.

\* cited by examiner

PAIRING DEVICE

FIELD OF THE INVENTION

The invention relates to a pairing device for establishing a secure wireless communication between a first device and a second device, said first device comprising a body-coupling communication interface, said second device screen, especially a touch-screen; to a secure communication method and to a secure communication system.

TECHNICAL BACKGROUND

Contactless devices are widely used for authentication. Individuals have a need for a unique contactless device comprising as much authentication information as possible for executing secure electronic transactions, logins on mobile device etc. . . . , without having to remember all of them.

The applicant has thus developed personal contactless devices allowing an individual to have in the same device a lot of authentication information, said device being wearable by individuals and having a body-coupling communication interface. The contactless device can be on a bracelet, an ankle, a belt, a garment, in a pocket etc. . . . .

The authentication is easy to perform for the user. Indeed, when a user, wearing said contactless device, touches (or is close enough) to a device to which the user has to be authenticated, the authentication is performed by the contactless device without any further action than the touching action to be performed by the user wearing the contactless device.

For example, when a user wearing said kind of contactless devices touches the doorknob of a door, said doorknob being able to communicate with the contactless device, it opens said door.

The contactless device communicates through the skin of the user with the device to which the user wants to authenticate. This kind of communication is named body-coupling communication (BCC). The BCC is based on the principle that modulated electric field may carry a signal on a user body according to a capacitive coupling mode, thus the human body, and more particularly the skin, is used as a wire between the contactless device and a device with which it communicates with to ensure authentication of the user.

Once the user has authenticated himself to a second device through the BCC link, a wireless communication is established between the contactless device and the second device to exchange authentication information in a secure way. The wireless communication can use various wireless protocols such as Bluetooth, Wi-Fi, zigbee etc. . . . .

One particularity of the contactless device developed by the applicant is an interface adapted to establish BCC link. This kind of contactless device aims to perform authentication with mobile devices. However, mobile devices are not BCC compliant and it is not possible to ask constructors of all kind of mobile devices to add a BCC interface to their mobile devices.

The meaning of mobile device is to be understood as any device allowing people to access data and information from wherever they are. These terms include mobile phone and portable devices, such as handset, tablets, PDAs, laptop computers, mobile computers, mobile phone, smartphone, etc. . . . .

SUMMARY

It is an object of the invention to provide a device allowing a user, wearing a contactless device comprising an interface for establishing BCC link, to authenticate to a non BCC compliant mobile device, said mobile device having a touch screen, without modifying the structure of said mobile device and contactless device.

To this end, the invention provides a pairing device for establishing a secure wireless communication path between a first device comprising a first body-coupling communication interface and a second device comprising a screen, said pairing device comprising:

a screen communication interface, said screen communication interface comprising a light sensor, said light sensor and the screen of the second device allowing the definition of a light-based communication path for the transmission of a first pairing information from the second device to the pairing device;

a calculator for generating a second pairing information once the first pairing information has been received by the pairing device;

a second body-coupling communication interface, said second body-coupling communication interface and the first body-coupling communication interface allowing the definition of a body-coupling communication path for the transmission of the second pairing information from the pairing device to the first device, said second pairing information allowing the establishment of a secure wireless communication path between the first device and the second device. In order to establish a secure wireless communication path between two devices, it is necessary to establish a pairing between those two devices. The pairing is performed by the pairing device which allows the transfer of pairing information from the second device to the first device. The first pairing information and the second pairing information could be the same information. The screen of the second device may be a touch-screen, for example a capacitive touch-screen or a resistive touch-screen. The BCC interface comprises an antenna for example.

According to not limited embodiments, the apparatus can comprise one or more of the following additional characteristics:

the screen communication interface comprises a conductive surface, said conductive surface and the screen of the second device allowing the definition of a capacitive-based communication path. The capacitive-based communication may allow the pairing device to wake up the second device. In this embodiment, the screen is a touch screen.

The invention also provides a secure communication method between a first device and a second device, said first device comprising a first body-coupling communication interface, said second device comprising a screen, wherein the secure communication method comprises:

a first step of coding a first pairing information and generating a light pulse corresponding to said first pairing information for illuminating a third area of the screen;

a second step of receiving said first pairing information by a pairing device according to any of the preceding embodiments;

a third step of generating a second pairing information by the pairing device;

a fourth step of establishing a secure wireless communication session, using said second pairing information, between the first device and the second device.

In order to establish a secure communication session between two devices, it is necessary to establish a pairing between those two devices. Here, the pairing between the first device, BCC compliant, and the second device, non BCC compliant but having a touch screen is ensured through the pairing device which is both BCC compliant and touch screen compliant. This pairing is a double step pairing. Indeed, firstly the pairing is established between the second device and the pairing device via a light-based communication. And secondly, the pairing is established between the pairing device and the first device via a BCC communication. Thus, a secure communication session can be established between those two devices without modifying the structure of the second device.

According to not limited embodiments, the method can comprise one or more of the following additional characteristics:

it comprises a fifth step of sending, through the secure wireless communication session, authentication information from the first device to the second device.

it comprises a sixth step of putting in contact the pairing device of any of the preceding embodiments with the touch screen of the second device. When the second device sends the first pairing information through the light-based communication path, the pairing device may be in contact with the screen of the second device and could answer to the receiving of the first pairing information with a touch. This touch is an acknowledgment of the message comprising the first pairing information.

it comprises a seventh step of biometrically identifying a user by a biometric sensor of the first device.

The invention also provides a secure communication system comprising:
 a first device comprising a first body-coupling communication interface;
 a second device comprising a screen; and
 a pairing device according to any of the preceding embodiments;
said secure communication system being configured so that:
 the first device is located, in use, in a first area and the pairing device is located, in use, in a second area, said first and second area being sufficiently close to a human body so that it allows the establishment of a body-coupling communication path between the first device and the pairing device for the transmission of a first pairing information;
 the positioning of the pairing device on the screen of the second device allows the establishment of a screen communication path between the pairing device and the second device for the transmission of a second pairing information;
 the transmission of the second pairing information defines a secure wireless communication session between the first device and the second device;
 the establishment of the wireless communication session defining a communication context.

The pairing device is adapted to establish an indirect communication between the first device and the pairing device as the pairing device is both BCC compliant, like the first device, and touch screen compliant, like the second device. The definition of the first area and of the second area depends on the sizing of the respective first and second body-coupling communication interface. The size and power of the antennas of these body-coupling communication interfaces determines the sizing of the first and second areas. The BBC path is not necessarily maintained once the wireless communication session is established.

According to not limited embodiments, the system can comprise one or more of the following additional characteristics:

the communication context is maintained as long as the first device is located in the first area and the second device is located in the second area. As long as a user wears the first device, which is a BCC compliant contactless device, meaning as long as the first device is in the first area, the pairing remains active. However the communication context may remain active without the need of the BCC;

the screen communication path is a capacitive-based communication path when the communication is performed from the pairing device to the second device;

the screen communication path is a light-based communication path when the communication is performed from the second device to the pairing device.

BRIEF DESCRIPTION OF THE DRAWINGS

Some embodiments of apparatus, method and system in accordance with embodiments of the present invention are now described, by way of example only, and with reference to the accompanying drawings, in which.

DESCRIPTION OF EMBODIMENTS

Figure 1:
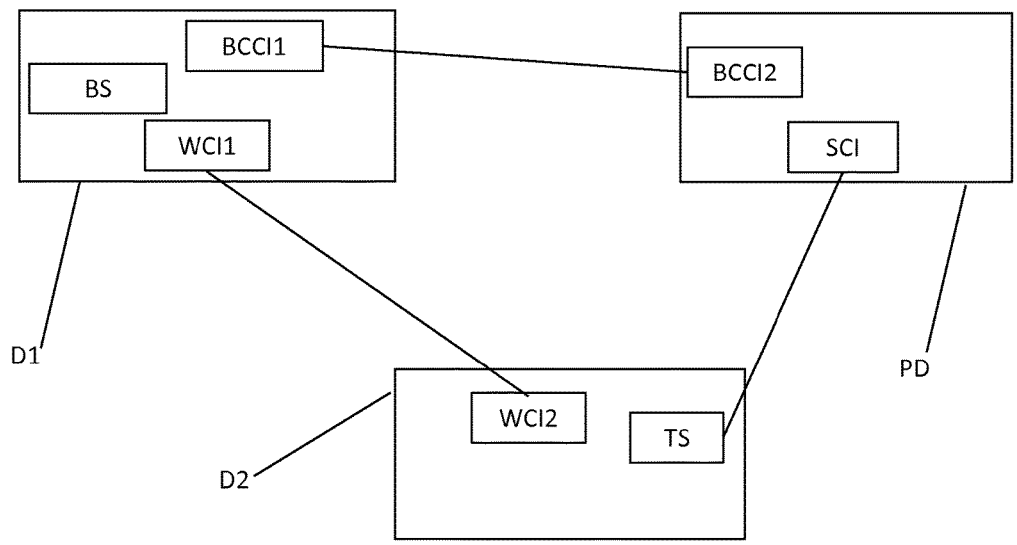
FIG. 1 schematically illustrates a secure communication system and pairing device, according to an embodiment of the invention.

Referring now to the drawings, FIG. 1 illustrates the basic parts of a secure communication system comprising a first device D1, a second device D2 and a pairing device PD for establishing a secure wireless communication path between the first device D1 and the second device D2.

The first device D1 is a wearable device and is aimed to contain personal authentication information of a user to authenticate a user to a second device D2 or to a software of said second device D2, said software being, for example an application for performing epayment.

The first device D1 comprises a first body-coupling communication (BCC) interface BCCI1 for establishing a body-coupling communication with a pairing device PD. A body-coupling communication is based on the principle that a modulation of electric field can carry a signal on human skin using a technique called capacitive coupling, the human body behaving as a capacitor. Thus, in use, the first device D1 is to be in a first area sufficiently close to a human body so that the human body can be used as a conductor for the BCC. By touching the pairing device PD, thus when the pairing device PD is located in a second area sufficiently closed to the human body of the user to establish BCC, a user, wearing the first device D1, allows the creation of a body-coupling communication path between the first device D1 and the pairing device PD. The first device can be, for example, integrated into an anklet, a bracelet, a necklace, a garment, a belt etc. . . . .

The first device D1 also comprises a biometric sensor BS, such as a finger print sensor for allowing the authentication of a user to said first device D1. Thus, as the first device D1 is aimed to contain personal authentication information, adding a biometric sensor increases the security of the communication system.

The first device also comprises a fourth wireless communication interface WCI1. The wireless communication can use various wireless protocols such as Bluetooth, Wi-Fi, zigbee.

The second device D2 comprises a touch screen TS. The second device D2 is a mobile device such as a smartphone, a tablet. The touch screen TS is preferably a capacitive touch screen. The second device D2 also comprises a fifth wireless communication interface WCI2. The user wearing the first device D1 aims to perform authentication action with said second device D2 which is not BCC compliant. In order to exchange authentication information between the fourth wireless communication interface and the fifth wireless communication interface, there is a need to pair in a secure way the first and the second device.

The pairing device PD comprises a second body-coupling communication interface BCCI2 for communicating with the first body-coupling communication interface BCCI1 of the first device D1. The second body-coupling communication interface BCCI2 has to be compliant with the first body-coupling communication interface BCCI1. The pairing device PD could be a stylus or a key holder for example. The pairing device could be of any kind as long as it is a device that can interact with both a screen and the skin of a user.

The pairing device PD also comprises a screen communication interface SCI. Said screen communication interface SCI is able to establish two kind of screen communication path depending on the way of the screen communication:

- a capacitive-based communication when the communication is performed from the pairing device PD to the second device. This capacitive-based communication can be performed through a conductive surface of the screen communication interface SCI, said conductive surface emulating the touching of a finger on a touch screen; and
- a light-based communication when the communication is performed from the second device D2, and its screen, to the pairing device PD. This light-based communication can be performed by a light sensor combined with a calculator analyzing the light pulse received and converting it in digital data.

Thus, the pairing device PD allows making indirectly the second device BCC compliant without modifying the design and the structure of the second device.

Once pairing the first device D1 and the second device D2 through the pairing device has been performed, the pairing device PD, when being a stylus can be used as a normal stylus to write on the touch screen TS of the second device D2 for example.

Figure 2:
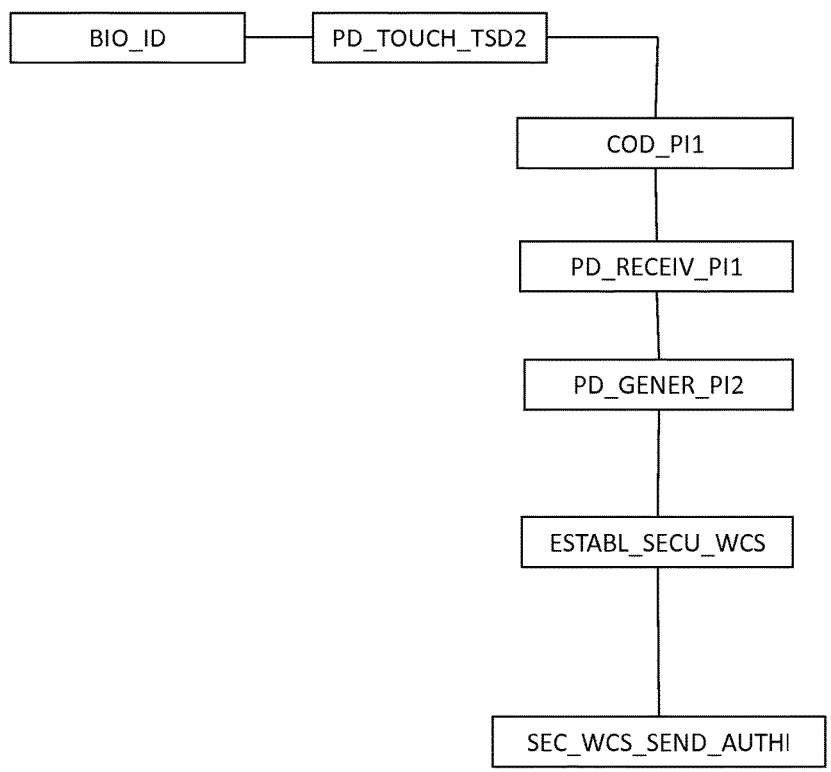
FIG. 2 schematically illustrates an embodiment of an authentication method according to an embodiment of the invention.

FIG. 2 describes steps of a secure communication method between a first device having a BCC interface and a second device having a touch screen to which a user wants to authenticate. In order to establish a wireless communication between those two devices, it is necessary to pair those two devices in order to secure the wireless communication.

Usually, the pairing is performed by entering manually a password via the touch screen TS of the second device. However, this operation has the drawback of necessitating for the user to memorize a huge amount of authentication information.

The communication method, thus, comprises a first step (step illustrated COD_PI1 on FIG. 2) of coding a first pairing information and generating a light pulse corresponding to the first pairing information for illuminating a first area of the screen of the second device. Coding the first pairing information could be performed by the second device or by a software, like a mobile application, of the second device. Once the first pairing information is coded, a light pulse based on this first pairing information is generated by the second device for illuminating a third area of the screen of the second device. The third area might be either the whole screen of the second device or a restricted area of the screen of the second device.

The secure communication method also comprises a second step (step illustrated PD_RECEIV_PI1 on FIG. 2) of receiving the first pairing information by a pairing device. The reception of the first pairing information by the pairing device is performed by a light sensor of the pairing device oriented towards the third area where the light pulse is generated.

Once the first pairing information is received by the pairing device, the method comprises a third step (step illustrated PD_GENER_PI2 on FIG. 2) of generating a second pairing information by the pairing device. The generation of the second pairing information is performed by a calculator of the pairing device, which may use the first pairing information. The second pairing information is sent to the first device by the pairing device through the BCC path established via the body-coupling communication interface of the first device and the second BCC interface of the pairing device.

Once the first device has received the second pairing information, the method comprises a fourth step (step illustrated ESTABL_SECU_WCS on FIG. 2) of establishing a secure wireless communication session between the first device and the second device. This secure communication is established by using the pairing information. Once the secure communication session has been established between the first device, which is borne by a user and contains its authentication information, and the second device, which could be a mobile device, the method comprises a fifth step (step illustrated SEC_WCS_SEND_AUTHI on FIG. 2) of sending, through said secure communication session, authentication information from the first device to the second device.

The secure communication session is preferably a wireless communication session using Wi-Fi protocol or Zigbee protocol or Bluetooth.

The method could comprise a seventh step (step illustrated BIO_ID on FIG. 2) of biometrically identifying a user by the first device. This seventh step may be performed, for example, at the initiation of the secure communication method. Indeed, as the first device is dedicated to contain all the authentication information of the user, the biometric identification provides a further level of security. The biometric identification could be performed by a specific sensor such as a fingerprint sensor, a voiceprint sensor etc. . . . . Biometric identification allows ascertaining that the individual bearing the first device is an authorized user. Indeed, as the first device is intended for containing sensitive authentication information of an individual such as id-numbers (social security number), bank card number etc. . . . , and the biometric authentication disables an individual who had stolen the first device of an user to use it.

In order to wake up the second device having a touch screen, the method could comprise a sixth step (step illustrated PD_TOUCH_TSD2 on FIG. 2) of putting in contact the pairing device, and especially its conductive surface, with the screen of the second device, thus establishing a capacitive-based communication between the pairing device, for example a stylus, and the touch screen TS of the second device.

The steps of the communication method could be performed in any order a man skilled in the art would judge pertinent.

The invention claimed is:

1. A pairing device for establishing a secure wireless communication path between a first device comprising a first body-coupling communication interface and a second device comprising a screen, said pairing device comprising:
   a screen communication interface, said screen communication interface comprising a light sensor, said light sensor and the screen of the second device allowing definition of a light-based communication path for transmission of a first pairing information from the second device to the pairing device;
   a calculator for generating a second pairing information once the first pairing information has been received by the pairing device;
   a second body-coupling communication interface, said second body-coupling communication interface and the first body-coupling communication interface allowing definition of a body-coupling communication path for transmission of the second pairing information from the pairing device to the first device, said second pairing information allowing establishment of a secure wireless communication path between the first device and the second device.

2. The pairing device of claim 1 wherein the screen communication interface comprises a conductive surface, said conductive surface and the screen of the second device allowing definition of a capacitive-based communication path.

3. A secure communication method between a first device and a second device, said first device comprising a first body-coupling communication interface, said second device comprising a screen, wherein the secure communication method comprises:
   a first step of coding a first pairing information and generating a light pulse corresponding to said first pairing information for illuminating a third area of the screen;
   a second step of receiving said first pairing information by a pairing device for establishing a secure wireless communication path between a first device comprising a first body-coupling communication interface and a second device comprising a screen, said pairing device comprising:
   a screen communication interface, said screen communication interface comprising a light sensor, said light sensor and the screen of the second device allowing definition of a light-based communication path for transmission of a first pairing information from the second device to the pairing device;
   a calculator for generating a second pairing information once the first pairing information has been received by the pairing device;
   a second body-coupling communication interface, said second body-coupling communication interface and the first body-coupling communication interface allowing definition of a body-coupling communication path for transmission of the second pairing information from the pairing device to the first device, said second pairing information allowing establishment of a secure wireless communication path between the first device and the second device;
   a third step of generating a second pairing information by the pairing device; and
   a fourth step of establishing a secure wireless communication session, using said second pairing information, between the first device and the second device.

4. The secure communication method of claim 3 comprising a fifth step of sending, through the secure wireless communication session, authentication information from the first device to the second device.

5. The secure communication method according claim 4 comprising a seventh step of biometrically identifying a user by a biometric sensor of the first device.

6. The secure communication method according to claim 3 comprising a sixth step of putting in contact the pairing device with the touch screen of the second device.

7. The secure communication method according claim 6 comprising a seventh step of biometrically identifying a user by a biometric sensor of the first device.

8. The secure communication method according to claim 3 comprising a seventh step of biometrically identifying a user by a biometric sensor of the first device.

9. A secure communication system comprising:
   a first device comprising a first body-coupling communication interface;
   a second device comprising a screen; and
   a pairing device for establishing a secure wireless communication path between a first device comprising a first body-coupling communication interface and a second device comprising a screen, said pairing device comprising:
   a screen communication interface, said screen communication interface comprising a light sensor, said light sensor and the screen of the second device allowing definition of a light-based communication path for transmission of a first pairing information from the second device to the pairing device and a capacitive-based communication path for transmission from the pairing device to the second device;
   a calculator for generating a second pairing information once the first pairing information has been received by the pairing device;
   a second body-coupling communication interface, said second body-coupling communication interface and the first body-coupling communication interface allowing definition of a body-coupling communication path for transmission of the second pairing information from the pairing device to the first device, said second pairing information allowing establishment of a secure wireless communication path between the first device and the second device;
   said secure communication system being configured so that:
      the first device is located, in use, in a first area and the pairing device is located, in use, in a second area, said first and second area being sufficiently close to a human body so that it allows establishment of a body-coupling communication path between the first device and the pairing device for transmission of a second pairing information;
      positioning of the pairing device on the screen of the second device allows establishment of a light-based communication path between the pairing device and the second device for transmission of a first pairing information;
      transmission of the second pairing information defines a secure wireless communication session between the first device and the second device;
      establishment of a wireless communication session defines a communication context.

10. The secure communication system of claim 9 wherein the communication context is maintained as long as the first device is located in the first area and the second device is located in the second area.

11. The secure communication system according to claim 10 further comprising establishment of a capacitive-based communication path for communication from the pairing device to the second device.

12. The secure communication system according to claim 11 wherein the capacitive-based communication path wakes up the second device from the pairing device.

13. The secure communication system according to claim 9 further comprising establishment of a capacitive-based communication path for communication from the pairing device to the second device.

14. The secure communication system according to claim 13 wherein the capacitive-based communication path wakes up the second device from the pairing device.

* * * * *